United States Patent [19]
Janes et al.

[11] Patent Number: 5,130,925
[45] Date of Patent: Jul. 14, 1992

[54] APPARATUS AND METHOD FOR ECONOMICAL CONTINUOUS, AND PREDICTABLE GREENHOUSE CROP PRODUCTION

[75] Inventors: Harry W. Janes, Sayreville, N.J.; Richard J. McAvoy, Storrs-Mansfield, Conn.; Michael S. Giniger, Somerset, N.J.

[73] Assignee: Rutgers, The State University, Piscataway, N.J.

[21] Appl. No.: 657,620

[22] Filed: Feb. 20, 1991

Related U.S. Application Data

[63] Continuation of Ser. No. 254,886, Oct. 7, 1988, abandoned.

[51] Int. Cl.$^5$ .................. G06F 15/20; A01G 1/00
[52] U.S. Cl. ........................ 364/420; 47/17
[58] Field of Search ............................... 364/420

[56] References Cited

U.S. PATENT DOCUMENTS

| Re. 31,023 | 9/1982 | Hall, III | 47/1.01 |
|---|---|---|---|
| 2,855,725 | 10/1958 | Carothers | 47/17 |
| 3,398,481 | 8/1968 | Lake | 47/58 |
| 3,478,817 | 11/1969 | Shaw | 165/21 |
| 3,613,308 | 10/1971 | Klein et al. | 47/17 |
| 3,673,733 | 7/1972 | Allen | 47/58 |
| 3,747,501 | 7/1973 | Honda et al. | 454/228 |
| 3,978,324 | 8/1976 | Rayner | 364/420 X |
| 4,015,366 | 4/1977 | Hall, III | 364/420 X |
| 4,028,847 | 6/1977 | Davis et al. | 47/65 |
| 4,146,993 | 4/1979 | Freeman, Sr. | 47/17 |
| 4,166,341 | 9/1979 | Vestergaard | 47/59 |
| 4,196,544 | 4/1980 | Davis et al. | 47/17 |
| 4,216,618 | 8/1980 | Haub et al. | 47/65 |
| 4,255,897 | 3/1981 | Ruthner | 47/65 |
| 4,265,300 | 5/1981 | Kurimoto | 165/47 |
| 4,291,674 | 9/1981 | Comte et al. | 126/419 |
| 4,292,762 | 10/1981 | Fogg et al. | 47/17 |
| 4,430,828 | 2/1984 | Oglevee et al. | 47/17 |
| 4,507,929 | 4/1985 | Dozier | 62/79 |
| 4,567,732 | 2/1986 | Landstrom et al. | 62/91 |
| 4,569,150 | 2/1986 | Carlson et al. | 47/17 |
| 4,755,942 | 7/1988 | Gardner et al. | 364/420 |

FOREIGN PATENT DOCUMENTS

86/05944 10/1986 PCT Int'l Appl. .
2037554 7/1980 United Kingdom .

OTHER PUBLICATIONS

Giniger et al., *Computer Simulation of A Single Cluster Tomato Cropping System*, American Society of Agricultural Engineers, Paper No. NAR 86-402, Aug. 1986.

Giniger et al., *Computer Simulation of a Single Truss Tomato Cropping System*, New Jersey Agricultural Experiment Station Publication No. D-03232-02-87, 1987.

Willits et al., "A Microprocessor-Based Control System For Greenhouse Research", *Transactions of the American Society of Agricultural Engineers*, 1980, pp. 688-698.

Acta Horticulturae, "Symposium On Computers In Greenhouse Climate Control", *Technical Communications Of The International Society For Horticultural Science*, No. 106, Mar. 1980.

Takakura et al., "Direct Digital Control of Plant Growth-I. Design and Operation of the System", *Transactions Of The American Society Of Agricultural Engineers*, 1974, pp. 1150-1154.

(List continued on next page.)

*Primary Examiner*—Dale M. Shaw
*Assistant Examiner*—David Huntley
*Attorney, Agent, or Firm*—Lerner, David, Littenberg, Krumholz & Mentlik

[57] ABSTRACT

A computer program simulates the growth pattern of plants grown in a controlled environment such as a greenhouse. The program produces planting and harvesting schedules, a schedule of predicted yields, and a schedule of greenhouse space utilization, which permit the planning of a controlled growing environment which is capable of producing continuous predictable yields of agricultural product over predetermined time periods. This result is useful in producing commercially viable agricultural production during the times of year when field grown agricultural production is unavailable.

11 Claims, 9 Drawing Sheets

OTHER PUBLICATIONS

Ting et al., *Engineering Economy of Controlled Environment for Greenhouse Production*, Paper No. 87-4546, Anerican Society of Agricultural Engineers, Dec. 1987.

Giacomelli et al., *Increased Greenhouse Tomato Plant Density with Movable Rows*, New Jersey Agricultural Experiment Station Publication No. J-03130-17-83, 1983.

Giacomelli et al., *An Alternative Concept in Greenhouse Tomato Production*, American Society of Agricultural Engineers, Paper No. NAR 82-404, Aug. 1982.

Giacomelli et al., *A Cable Supported Tomato Production System for the Greenhouse*, American Society of Agricultural Engineers, Paper No. 83-1096, Jun. 1983.

Giacomelli et al., *A Cable Supported NFT Tomato Production System for the Greenhouse*, New Jersey Agricultural Experiment Station Publication No. E-03130-21-82, 1982.

Giacomelli et al., *A Cable Supported NFT Tomato Production System for the Greenhouse*, New Jersey Agricultural Experiment Station Publication No. K-03130-27-82, 1982.

Giacomelli et al., *Greenhouse Tomato Production in a Movable Cable Supported Growing System*, New Jersey Agricultural Experiment Station Publication No. J-03130-25-83, 1983.

McAvoy et al., *Greenhouse Tomato Production in a Transportable, Potted Plant Cropping System*, New Jersey Agricultural Experiment Station Research Report E-03130-15-85, 1985.

McAvoy et al., *High Pressure Sodium Lighting and Tomato Cropping: Three Supplemental Light Levels and Three Plant Densities*, American Society of Agricultural Engineers, Paper No. 83-3016, Jun. 1983.

McAvoy et al., *The Effect of Supplemental Lighting with High Pressure Sodium Lamps on Greenhouse Tomato Crop Production*, New Jersey Agricultural Experiment Station Publication No. K-03130-28-82, 1982.

McAvoy et al., *Supplemental Lighting and its Effects on Greenhouse Tomato Production*, New Jersey Agricultural Experiment Station Publication No. J-03130-11-86, 1986.

McAvoy et al., *Alternate Cropping Strategies for Greenhouse Tomatoes Using Supplemental Lighting*, New Jersey Agricultural Experiment Station Publication No. D-03130-13-86, 1986.

McAvoy, *Evaluation of a Single Flower Cluster, High Plant Density Greenhouse Tomato Crop System Using High Pressure Sodium Lights*, American Society of Agricultural Engineers, Paper No. NAR 84-405, Aug. 1984.

APPARATUS AND METHOD FOR ECONOMICAL CONTINUOUS, AND PREDICTABLE GREENHOUSE CROP PRODUCTION

This is a continuation of application Ser. No. 07/254,886 filed Oct. 7, 1988, now abandoned.

FIELD OF THE INVENTION

The invention of this application relates to agricultural crop production in a controlled environment. More specifically, the invention relates to agricultural crop production which is economical, continuous, and predictable and which involves efficient utilization of available space in a controlled environment.

BACKGROUND OF THE INVENTION

In most areas of the world, especially in the temperate regions, there is a limited growing season for most agricultural crops. During the time of the year in which any given crop cannot be grown in a particular area, consumption of that crop must be foregone or supplies of that crop must be imported from other areas. Doing without a particularly desirable crop is usually an unsatisfactory alternative. Importing a crop from other regions also has drawbacks. For instance, importing a crop involves transportation costs which increase the final cost to consumers over that which would be the case if the crop could be grown locally. Importing of crops during the off-season almost always involves transporting them over long distances, which involves a long period of time between harvest and consumption. To avoid spoilage, this period of time necessary for transporting tee crop to where it is to be consumed requires that the crop be harvested before it has had a chance to ripen sufficiently. This procedure of harvesting a crop before it has had a chance to fully ripen usually causes the flavor and other sensory characteristics of the final product to be substantially less desirable than they might have been had the harvest taken place when the crop was fully ripened and had the crop been consumed shortly after harvest. Crops grown in distant places and transported to areas unable to grow that crop are thus not as desirable as those grown close to where they are consumed.

Growing crops in controlled environments, such as greenhouses, in the off-season has been used in an attempt to provide desirable crops during non-growing seasons. Efforts to date have been frustrated by the fact that producing crops in a greenhouse environment is an expensive proposition relative to producing those crops outdoors in the usual manner. Increased expenses are due to costly equipment needed to control the environment in which the crops are grown and the intensive labor required in tending the crops and harvesting them. It is, therefore, imperative that the greenhouse be operated in a most efficient manner for the production of greenhouse grown crops to be accomplished in a commercially viable manner.

Commercial greenhouse crop production will be more viable only if it is possible to accurately predict crop yields, if it is possible to produce crops with a predictable yield on a continuous basis for predetermined extended periods of time, and if it is possible to utilize greenhouse space in the most efficient manner possible. To date, these aims have not been achieved in a satisfactory manner so that, for the most part, consumers have had to forego the consumption of certain crops during the off-season or they had to endure the consumption of crops having undesirable qualities grown far away during the off-season.

There have been many attempts to automate the control of the greenhouse environment. None of those attempts addressed effectively the problems of continuous, predictable yield and efficient utilization of greenhouse space. Thus, prior efforts have been unable to provide a commercially viable greenhouse crop production system.

A paper by Giniger and McAvoy, entitled "Computer Simulation of a Single Cluster Tomato Cropping System", presented at the Aug. 3-6, 1986 meeting of the American Society of Agricultural Engineers purports to deal with the need for continuous, predictable yields of tomatoes produced in a greenhouse and the need for efficient allocation of space in the greenhouse growing system for a single cluster tomato cropping system. The paper says that a computer simulation growth model was developed which sets up a growing schedule that results in continuous, predictable crop yield and optimized greenhouse space utilization. There is no computer hardware, flow chart, or computer software disclosed in the paper relating to the computer simulation growth model. There is insufficient information given in the paper for any of this to be developed. Accordingly, not enough information is given in the paper which will enable a person skilled in the art to make the computer model mentioned in the paper or to make another apparatus capable of achieving the aims mentioned in the paper. Moreover, some of the information said by the paper to be needed to achieve those aims have been found by the inventors not to produce the desired result of continuous, predictable yield and optimized greenhouse space utilization. For example, the paper describes an incorrect relationship between the amount of available light and the number of days from emergence to first flowering in tomato plants.

Accordingly, it is an object of the invention to overcome the problems experienced in the past in connection with growing crops in a controlled environment which hindered the growing of such crops in a commercially viable manner.

It is also an object of the invention to economically produce crops in regions where the weather conditions are not suitable for growing such crops.

It is a specific object of the invention to provide an apparatus and method which instruct the grower how to achieve economical production of crops grown in a controlled environment on a continuous and predictable basis.

It is a further object of the invention to provide an apparatus and method which instruct the grower about how to achieve efficient space allocation in a controlled environment, such as a greenhouse.

It is an additional object of the invention to provide an apparatus and method which are able to schedule the planting of crops in a greenhouse so that they are harvested on desired dates.

It is also an object of the invention to provide an apparatus and method which predict the yield of crops grown in a greenhouse.

Other objects and advantages of the invention are either specifically described elsewhere in this application or are apparent from that description.

SUMMARY OF THE INVENTION

The invention of this application involves an apparatus and method which produces for a grower a planting schedule, a schedule of predicted yields, and a schedule of space allocation in a given greenhouse. The apparatus and method will permit the grower to achieve continuous, predictable crop production in such a manner that controlled environment agriculture will become a commercially viable proposition. A specific example of the invention is described involving a computer simulation of plant growth in a single truss tomato cropping system. The claims define the scope of the invention for which the inventors seek patent protection.

DETAILED DESCRIPTION OF THE INVENTION

A production model, growing system, and growing procedure in accordance with this example of the invention provides solutions to the problems of winter time greenhouse production of high quality saleable agricultural products in a commercially viable manner. It does this by permitting production of agricultural products with a predictable yield on a continuous basis during predetermined time periods The apparatus and method of this example of the invention may take information such as the size of the greenhouse, the date the product is needed, and available light data and then may recommend to the operator of the greenhouse the timing of specific plant care operations. It also predicts product yield for a continuous time period after the date that growing is begun.

The example of the invention described here is for single cluster tomato production. It can be modified so that it is applicable to other edible or ornamental crops grown in a controlled environment such as a greenhouse.

One feature of the invention is a plant growth model based on the fact that a variety of environmental factors, such as light, humidity, carbon dioxide, and temperature, control the growth and reproductive behavior of plants, within limitations defined by the genetic make-up of the plants. The example of the model described here addresses light as the most significant limiting factor in greenhouse crop production in the northern hemisphere in the winter. Specifically, the model accurately predicts harvest time and total yield as a function of the light received by the crop, in this instance, within certain limits of $CO_2$ concentration (about 400–800 microliters/liter) and temperature (about 21-27 degrees Centigrade during the day and about 15-17 degrees Centigrade at night). The model allows the grower to observe the effects of modifying the amount of light to which the crop is exposed. He may have harvests occur during predetermined time periods and he may enhance yields by following the strategies suggested by the invention. The plant growth model may be incorporated into a larger automated production control scheme with the goal of permitting an unskilled grower to produce a high quality product that can be marketed effectively because the yield is high, predictable, and continuous. More importantly, agricultural products can be grown in a greenhouse or other controlled environment in a commercially viable manner so that high quality agricultural production can take place all year round in areas having limited growing seasons.

Figure 1:
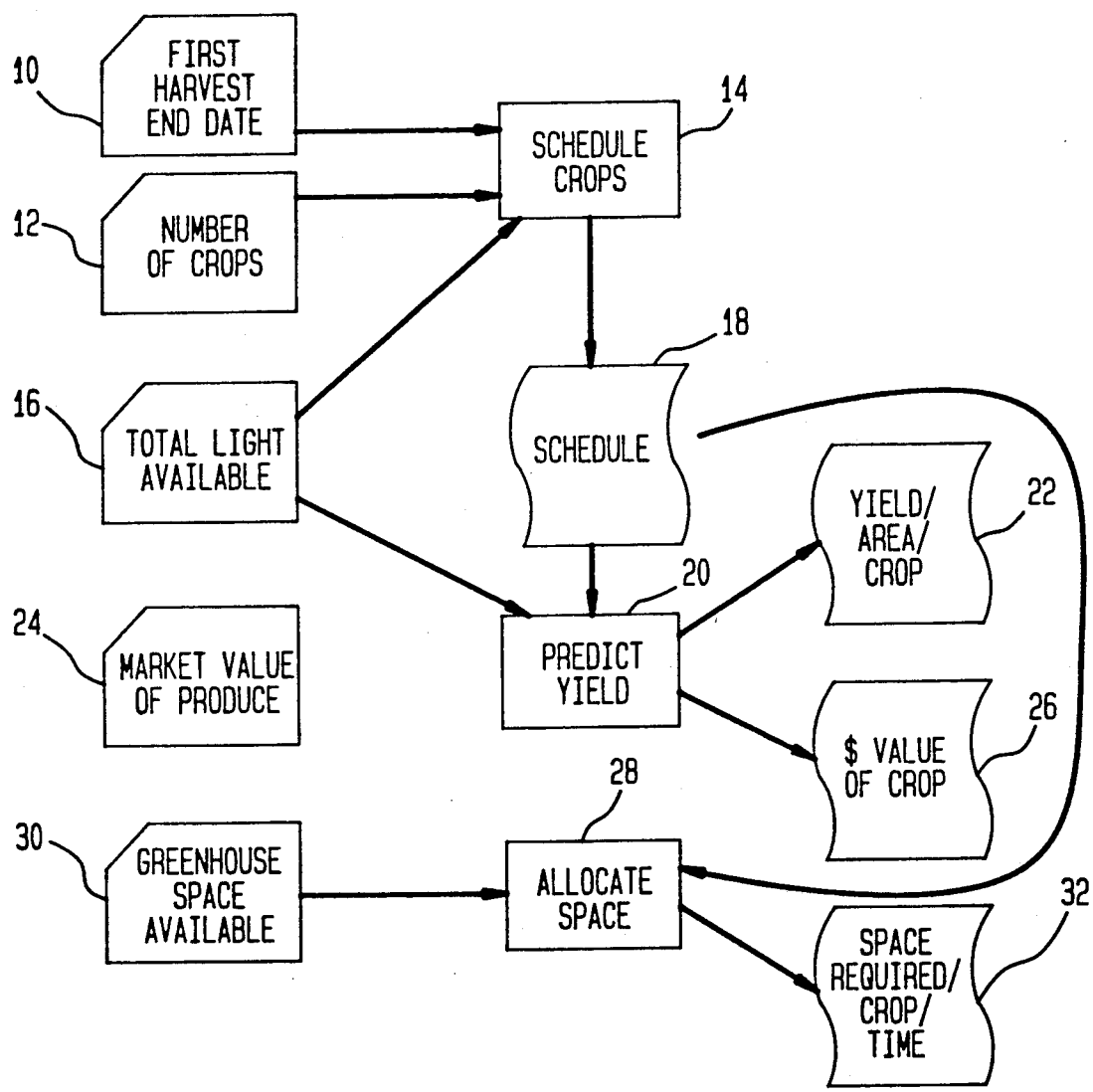
FIG. 1 is a schematic diagram representing the electronic circuitry in an example of the invention of this application.

FIG. 1 is a block diagram of electronic circuitry for carrying out an example of the invention which advises a grower about how to grow single truss tomatoes, *Lycopersicon Esculentum*, in a controlled environment greenhouse with continuous, predictable yield at predetermined times and with efficient greenhouse space utilization. The other Figures show the circuitry of FIG. 1 in more detail.

The circuitry of the invention in effect simulates the timing of certain events in the growth cycle of plants grown in a greenhouse and produces planting and harvest schedules, yield predictions, and schedules of greenhouse space utilization. The grower may insert data relating to the number of crops to be harvested, the timing of those harvests, and the amounts of certain environmental parameters available in the greenhouse. After inputing these items, the grower may run the simulation and thereby observe the effects of those inputs on the operation of the greenhouse. He may also change these inputs and rerun the simulation to observe the effects of the changes so that he may select crop management strategies and environmental conditions which will permit him to achieve desired crop yields, the timing of the harvests, and utilization of space in the greenhouse.

As known by those skilled in the art, single truss tomato plants are those produced by soft pinching the apical meristem of the tomato plant one leaf above the first to appear flower truss or cluster. In this example of the invention, tomato seed is first osmotically primed by soaking it for about seven days in a salt solution generally known to be useful for this purpose, which may be an aqueous solution containing about 1.5 percent $KNO_3$ and about 1.5 percent $KH_2PO_4$. Air is bubbled through the solution containing the seed for the priming period This has been found to facilitate a predictable germination date for tomato seed, about two days after the seed has been sown in a growing medium.

After priming, the seed is sown in a plug tray containing a suitable growing or potting medium. The growing medium for each of the stages of growth described below may be any generally known soil-less culture technique, involving either the supply of a nutrient solution alone to the growing plants or involving the supply of a nutrient solution to the plants through a root supporting matrix. Suitable soil-less culture techniques include nutrient film techniques, sand cultures, rockwool cultures, peat-lite cultures, and the like. An example of a growing medium which has been successfully used is a uniform mixture of peat moss, vermiculite, and pearlite mixed in a 40:40:20 ratio, respectively. In addition to these soil-less culture techniques, conventional soil cultures may be used to grow the tomato plants.

The seed is sown so that the resulting tomato plants have an initial density of about 1550 plants per square meter. After a predetermined number of days, the plants are transplanted to four inch pots and spaced so that there is a density of about 97 plants per square meter. After another predetermined number of days, the four inch pots are spaced farther apart, so that the plants have a density of about 24 plants per square meter. After a final predetermined period of time, the plants are transplanted to 11 liter plastic bags containing a sufficient amount of suitable growing or potting medium and spaced so that the plants have a final production density of about 12 plants per square meter. The tomatoes are planted in equally sized discrete crop blocks over a predetermined time. Each of the crop blocks comprises a predetermined number of tomato plants sown at a predetermined time. The plants within each crop block are harvested at the same time. As described below, in addition to scheduling planting and harvesting, the invention of this application schedules the spacings of the plants so that the grower may plan for efficient space utilization in the greenhouse.

Although the circuitry shown in the Figures of this application may be implemented in a variety of ways, the inventors have implemented that circuitry as a program in a digital computer. An example of such a program is illustrated in Appendix 1 at the end of this description. The program is written in the BASIC computer language and has been successfully run on an IBM PC compatible personal computer in the form of a Zenith Model ZW-241-82 personal computer using the Microsoft MS-DOS disk operating system and the Microsoft QuickBASIC compiler.

FIG. 1 shows a start date block 10 which represents stored data input to the circuitry of the invention by the grower relating to the date STAR or CYCEN(1) at which it is desired to end the harvesting of the first in time crop block. The first in time crop block in this example of the invention is harvested for a predetermined fixed time period, for example, a time period of about two weeks in the case of tomatoes. As explained below, in this example of the invention, all of the crop blocks are harvested for a fixed predetermined time period, which may be the same amount of time the first in time crop block is harvested. The time period during which crops are harvested on a continuous, predictable basis thus begins this fixed predetermined time period before the date input by the grower and stored in block 10.

The beginning of the harvest of greenhouse grown crops may be selected to begin at the date on which field grown crops are no longer available because of unfavorable weather conditions. For example, the beginning of the first harvest may be the date on which the first frost of the year is expected. In the central New Jersey area, in which the invention has been successfully tested, that date may be from about October 15 to about October 31. The first harvest end date from block 10 thus is two weeks after this selected harvest start date in this example of the invention.

The circuitry of this invention accomplishes all of its date calculations by using Julian date representation: rather than calendar dates. Julian dates are merely consecutive integers which have been assigned to respective consecutive calendar dates. In specific terms, the beginning day of the year may be assigned the integer 1 and each successive day may assigned the next higher integer up to the last day of the year which is assigned the number 365 (366 for a leap year). The circuitry of the invention is capable of converting the Julian dates that have been calculated into the conventional calendar dates for display to the operator of the greenhouse.

FIG. 1 also shows a block 12 which contains stored input data obtained from the grower representing the number of discrete crop blocks NCRP that the grower desires to harvest in a predetermined period of time. As mentioned above, each crop block comprises a predetermined number of plants which have been sown at the same time. As explained below, the date on which seed is to be sown for each crop block will be determined in this example of the invention. The plants within each crop block will be harvested at the same time. As also explained below, the dates that the harvest is to take place for each crop block is determined by this example of the invention. The period during which each crop block will be harvested is a fixed period of time, for example, about two weeks for the tomato plants of this example of the invention. As an example of a grower's considerations that might go into setting the number of crop blocks, a grower may wish to produce continuous, predictable yields of tomatoes during the time of the year when field grown tomatoes cannot be grown, such as from October to June in the northeastern United States. In this example, the grower may decide to have about 20-30 discrete harvests, each harvest taking two weeks, some of which may overlap in time.

In both instances, the data in the blocks 10 and 12 are requested by the circuitry of this example of the invention and the grower manually inputs the desired data in response to queries which may be shown on a display which is a part of a computer system such as the one identified above. The data entered by the grower is then stored in suitable storage elements in the computer system.

FIG. 1 also shows a block 16 containing data relating to the total amount of light available to the plants at the times of the year during which greenhouse crop production is to take place. The data may be stored in some form of data base in the computer, such as a memory element or an array. It also may be computed in light of the input of certain information such as the date. The data may comprise estimates based on historical weather data or it may be estimates based on other information relating to the amount of light which will be available. The total light available comprises the total amount of photosynthetically active radiation ("PAR") as a function of date, which may comprise PAR from sunlight and PAR from artificial light sources, for example, from high pressure sodium lamps in the greenhouse. For the case of tomatoes, PAR is radiation in the 400-700 nanometer wavelength range of the electromagnetic energy spectrum. The data relating to total light available may be a fixed estimate or it may be changed dynamically based on actual amounts of light available as recorded by radiation sensors.

Although the data in block 16 is shown in FIG. 1 as being related to available light, data related to other factors known to affect plant development may also be used in the computations based on the contents of block 16, such as carbon dioxide levels, humidity, and temperature. The computations would be based on empirically determined relationships between the growth and development of the plants and the amount of the plant development factors. For simplicity of description, only the effects of PAR on the development of tomato plants are described here as an example of how plant development factors can be taken into account in determining planting and harvesting schedules and in predicting yields.

The total light data from block 16 as well as the harvest end date data from block 10 and the number of crops data from block 12 is input to a block 14 which calculates a schedule of planting dates for each of the crop blocks, which tells the grower on which date he should plant each crop block. The planting schedule is delivered to a storage block 18, which may be a data base associated with a computer, such as an array or a memory element, which in turn inputs the schedule to a block 20 which computes a predicted yield based on the schedule and the total light data from block 16. The predicted yield is stored in an output block 22 which, in this instance, contains data relating to yield per area for each crop block The amount of artificial lighting may be adjusted to give a desired computed planting and harvest schedule and a desired computed yield. The effects of increasing the artificial lighting may be determined by appropriately changing the data from block 16 and computing the planting and harvest schedules in block 14 and yield in block 20 based on the changed data in block 16.

Although it is not a part of the program of Appendix 1, in addition to computing the predicted yield, the block 20 may also compute the dollar value of all or a portion of the greenhouse crop production. To accomplish this, data relating to the market value of the produce being grown is fed to the block 20 from block 24. Block 20 computes the dollar value of the produce based on the market value data and the computed yield. The result of this computation is stored in a memory element 26.

A block 28 is responsive to the schedule from block 18 and to data relating to the amount of greenhouse space from block 30. It computes the space required for each crop as a function of time during the greenhouse growing season and stores that information in block 32. This information may be used by the grower so that he can effectively plan the amount of greenhouse space he may need and how to use that space in a most efficient manner.

Figure 2:
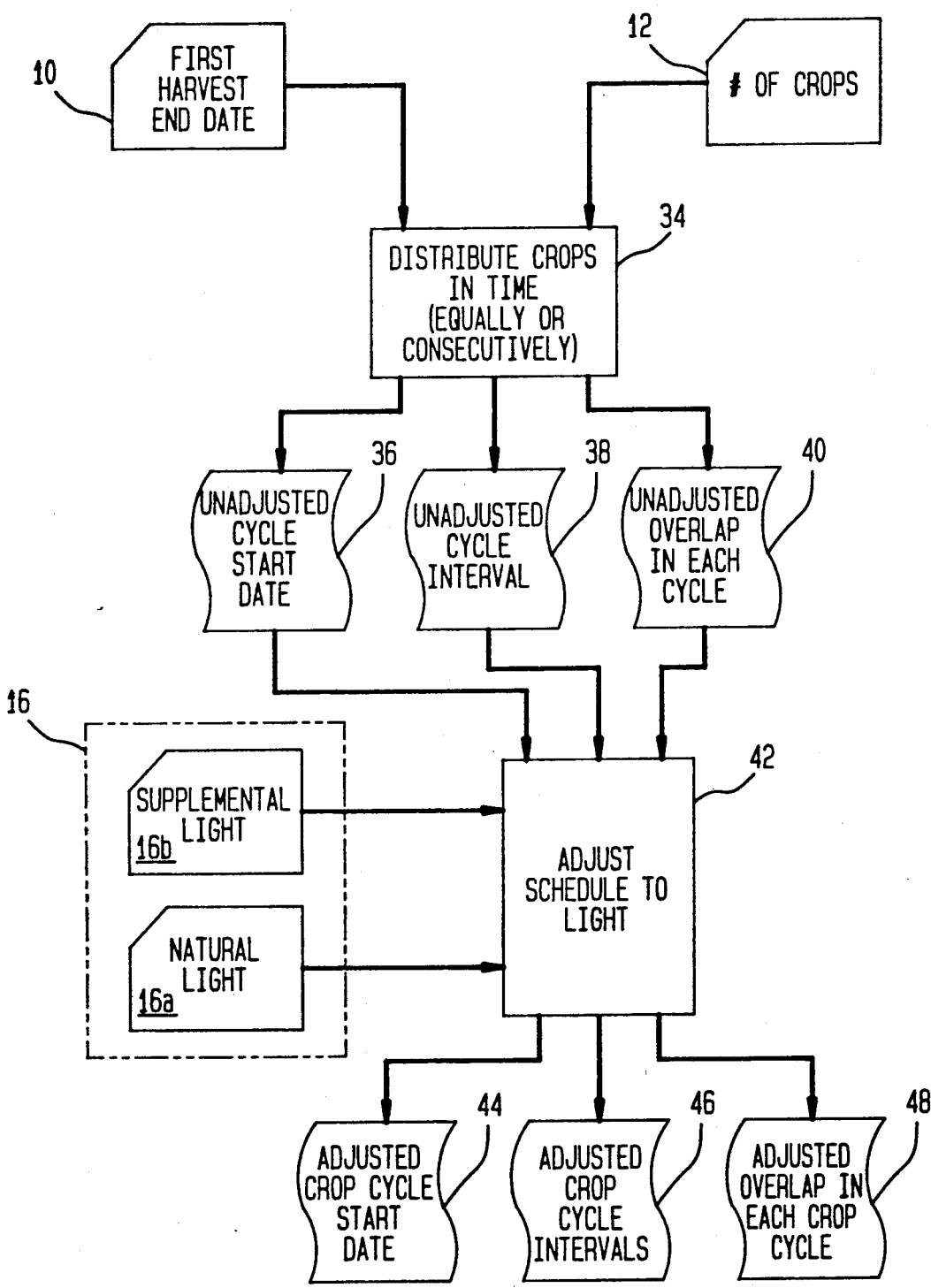
FIG. 2 is a more detailed schematic diagram representing the electronic circuitry of the crop schedule block of FIG. 1.

FIG. 2 shows in more detail the crop scheduling block 14 of FIG. 1. As in FIG. 1, block 10 contains data relating to the desired end of first harvest date and block 12 contains data relating to the desired number of crop blocks in a predetermined period of time. The data from blocks 10 and 12 is delivered to a block 34 which computes the dates for the crop blocks so that they are spaced in a predetermined fashion over the time period of operation of the greenhouse production system. As shown in FIG. 2, the crops ma be spaced equally over a predetermined period of time with the possibility of some overlap in the time some of the crop blocks are in the greenhouse. The crop blocks may also be spaced in time so that there is no overlap in the times any crop blocks are in the greenhouse.

The results of the computations in block 34 include a cycle start date CYCST(1) which is stored in a storage element 36. The cycle start date which is stored in element 36 is unadjusted for the effects of PAR on the development of the crops. To compute this date, the block 34 takes the Julian date on which it is desired to end the first harvest CYCEN(1) or START, received from block 10, and subtracts a number related to the minimum time (95 days in the program of Appendix 1) that is expected between the time the plants in the first crop block emerge from its growing medium and its harvest is ended. The minimum time is based on the physiology of the plants being grown and may be determined by empirical testing. In the case of tomatoes, it has been found that the minimum time between the date of emergence of plants from the growing medium and the date of final harvest (assuming a two week harvest time period) is about 95 days to about 105 days. In the example of the invention in Appendix 1, 95 days is assumed to be such minimum time. The Julian date of the emergence of the first in time crop block thus is the Julian date of the end of the harvest for the first crop block minus 95, which is the date stored in element 36. Seed is primed nine days prior to emergence and sown two days prior to emergence.

Block 34 also computes, for each crop block I, harvest ending dates CYCEN(I) and emergence dates CYCST(I) and stores that information in a storage element 38. Again, these dates are not adjusted for the effects of available light. The dates of priming and sowing may be computed by the circuitry of FIG. 1 and stored for later display in light of the predetermined time periods before the emergence dates these actions are to be taken. The contents of the element 38 represent the time periods during the year when each crop block will be in the greenhouse, those periods being unadjusted for the effects of available light. In the example of the invention represented by Appendix 1, the crop blocks are distributed evenly over a 365 day period.

Block 34 finally computes information relating to the overlap in time of the crop blocks EXTRA and OVERLAP, in the case of Appendix 1, for evenly distributed crop blocks, and stores that information in a storage element 40. This information may be used to compute the dates of emergence and end of harvest for each of the crop blocks.

The schedule developed by the block 34 must be adjusted for the effects of the amount of an environmental parameter, such as light, available to the plants while they are developing. In brief, if the amount of light available is below some level, then the sowing of a crop block must be done earlier than that indicated by merely evenly spacing the crops over the course of a year.

It has been found that the amount of PAR received by a crop block from the date of emergence to the date the first flower appears affects the amount of time between emergence and such first flowering. Applicants have empirically determined, for tomato plants, the relationship between the amount of PAR received and the time between emergence and first flowering as follows:

$$DAYS = [(-0.049) \cdot LIGHTOT] + 86,$$

where DAYS is the number of days from the time that the plant emerges from the soil or other growing medium to the time of first flowering and LIGHTOT is the amount of PAR received in moles per square meter. This relationship is used by the block 42 to compute (1) an adjusted emergence date and consequently adjusted sowing and priming dates which may be stored in a storage element 44, (2) adjusted end of harvest date and emergence date for each crop block which are stored in storage element 46, and (3) adjusted crop overlap information stored in storage element 48.

Figure 2A:
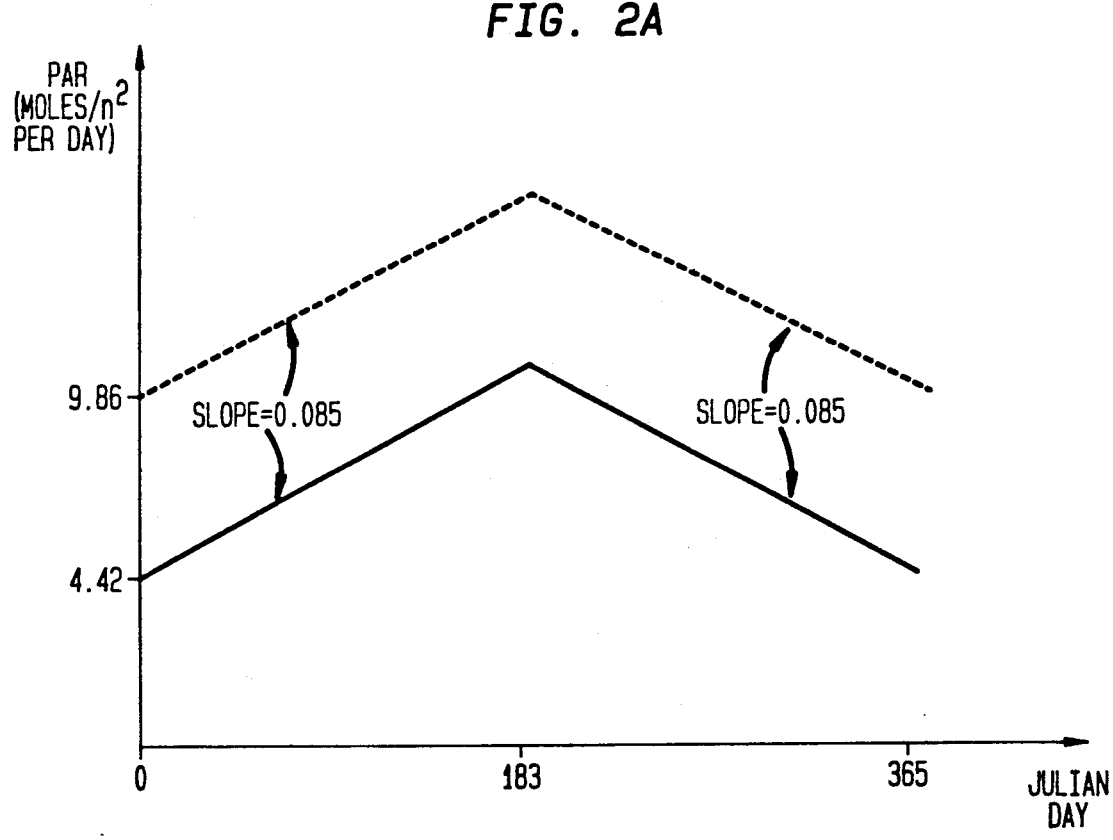
FIG. 2a is a graph showing how much light is available for growing plants as a function of Julian date in one example of the invention.

The computations made by block 42 are based on the data related to the amount of available PAR from block 16. As shown in FIG. 2, the available light data is made up of two components, available natural PAR data from block 16a and available supplemental PAR data from block 16b. For the case of growing tomatoes in the central New Jersey area, the inventors have found that satisfactory results may be obtained if it is assumed that the amount of natural light as a function of date is in accordance with the graph of FIG. 2a, which shows that the natural light has a minimum of about 4.42 moles per square meter per day on January 1 (Julian day 0) increasing linearly (slope=0.085) to a maximum on Julian day 183 and decreasing linearly (slope= −0.085) to 4.42 moles per square meter per day on December 31 (Julian day 365). The amount of supplemental lighting, such as that available from high pressure sodium lamps, that may be used is a fixed amount each day, which may be about 5.44 moles per square meter per day. The amount of light on any given Julian day J may be represented as follows:

$$LIGHT = [ABS(J) \cdot 0.085] + [4.42 \cdot LPCT]$$

where LIGHT is the amount of PAR available on any Julian day J in moles per square meter per day, ABS is an absolute value function defined below, and LPCT is equal to one plus the quotient obtained by dividing the amount of artificial light available per day, in the example of FIG. 2a, about 5.44 moles per square meter per day, by minimum expected amount of natural light per day, estimated by the inventors to be about 4.42 moles per square meter per day in the central New Jersey area based on historical weather data. This minimum amount of light usually occurs in late December in New Jersey.

Figure 3:
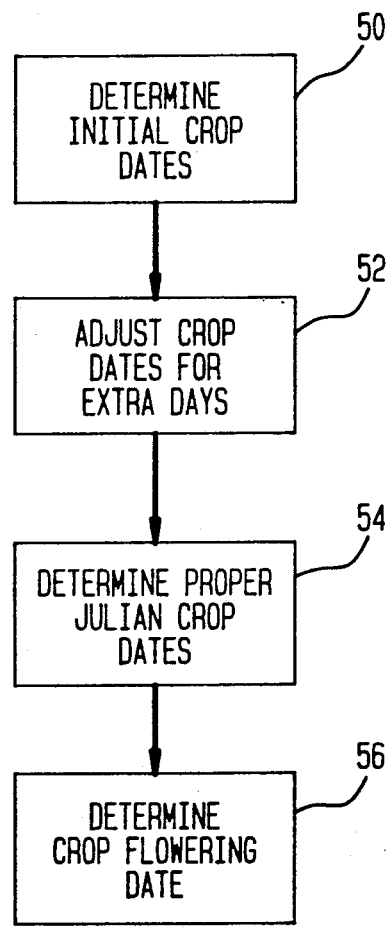
FIG. 3 is a more detailed schematic diagram representing additional aspects of the electronic circuitry in the crop scheduling block of FIG. 1.

FIG. 3 shows some of the other aspects of the crop scheduler in the program of Appendix 1. At block 50, the scheduler determines initial crop dates, that is, the emergence dates CYCST(I) and harvest ending dates CYCEN(I) for each crop block, by arbitrarily distributing the crop blocks over a predetermined time period, for example, they may be distributed uniformly over time as described above. Block 52 then takes any extra days left over from an even distribution of crop blocks over the predetermined time period and distributes them to the crop blocks in some predetermined fashion. In the case of a 365 day predetermined time period, 365 is divided by the number of crop blocks in the 365 day time period, which results in an integer quotient and an integer remainder. The remainder is the number of extra days. These extra days may be added to predetermined ones of the crop block schedules. For example, an extra day may be added to the number of days assigned to each of the first in time crop blocks, the number of crop blocks to which an extra day is added being equal to the number of extra days calculated by the division referred to above.

The scheduler of this example of the invention also determines proper Julian dates as the result of its calculations. When working with Julian representations of date, it is sometimes possible to arrive at negative numbers or numbers greater than the number of days in a year, which are not defined. The program takes any of those results, should they occur, and converts them into numbers which are meaningful Julian dates. This is accomplished in block 54.

The program also fixes the first flowering date for each of the crop blocks in block 56. The first flowering date is the date on which the first flower opens anywhere within a crop block. Emergence dates, sowing dates, and priming dates may be computed in light of these first flowering dates and in light of the available light or other environmental growth factors that are being taken into consideration.

Figure 4:
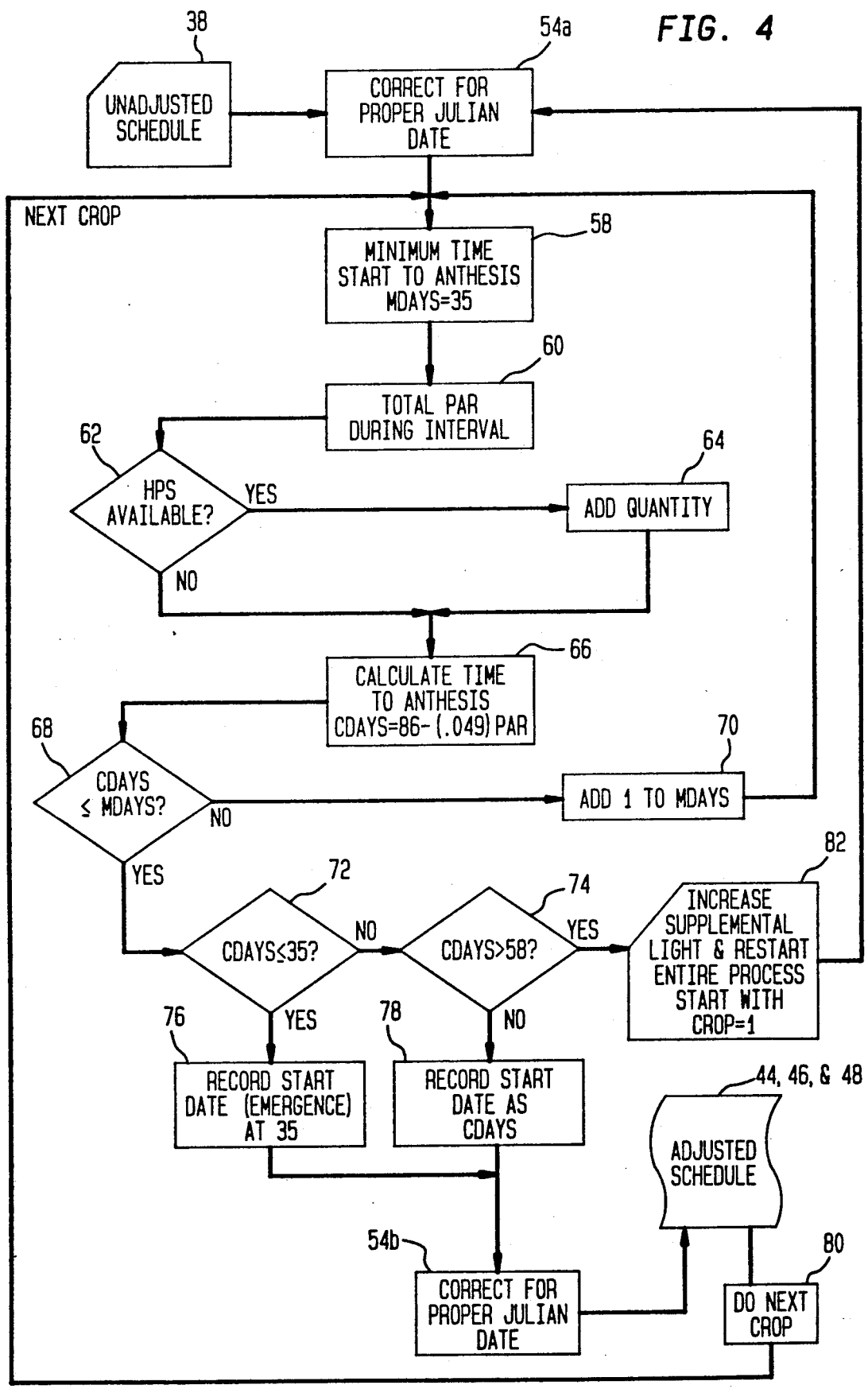
FIG. 4 is a more detailed schematic diagram representing the electronic circuitry of the flowering date determination block of FIG. 3.

FIG. 4 shows the details of circuitry for fixing the proper first flowering date or date of first anthesis for each of the crop blocks and the adjustment of the emergence, sowing, and priming date of each crop block based on the available light. These determinations are based on the time it takes for the plant to achieve first anthesis or first flowering after emergence from its growing medium. In the case of tomato production in a greenhouse, it has been found that the minimum time between emergence and first anthesis is about 35 days regardless of the amount of light available. At some point, decreasing the amount of light available will increase the amount of time it takes for the tomato plant to achieve first flowering. Decreasing of light cannot be done without limit, however. There comes a point where there is insufficient light for proper growing of tomatoes which defines a maximum amount of time between emergence and first anthesis. This maximum amount of time is about 58 days. The circuitry of FIG. 4 sets the desired flowering date for each of the crop blocks at a point 35 days after the initially determined emergence date (which has been found to occur 2 days after sowing of primed tomato seed). The originally determined priming, sowing, and emergence dates are adjusted based on the light available from the sun and supplemental light sources.

The dates in the unadjusted schedule in storage element 38 are corrected so that they are proper Julian date representations in block 54a. At block 58, the minimum possible time between the emergence of a crop in a crop block and first flowering of plants in that crop is identified at 35 days and a variable MDAYS is set at 35. In the following computations, the date of first flowering is considered to be fixed at 35 days from the initially determined unadjusted emergence date (37 days from the unadjusted date that osmotically primed seed is sown). The total expected PAR from the sun is computed for the 35 days between the unadjusted emergence date of the crop and first anthesis in block 60. A check is made at block 62 to see if supplemental lighting is available. If it is, at block 64, the amount of supplemental lighting available during the 35 days between the unadjusted emergence date and first flowering is added to the amount of PAR computed in block 60. If there is no supplemental light available, or after the amount of available supplemental light has been added to the PAR due to sunlight, then the number of days (CDAYS) needed for first anthesis in light of the available PAR is computed by using the equation identified above in block 66. A check is then made at block 68 to see if CDAYS is less than or equal to MDAYS. If not, meaning that there is insufficient light available for first anthesis to occur 35 days after emergence, the MDAYS variable is incremented by one in block 70 and the operations of blocks 58, 60, 62, 64, 66, and 68 are repeated based on the new value for MDAYS and the newly calculated CDAYS after the incrementation of MDAYS. This process is repeated until CDAYS is less than or equal to MDAYS.

The condition of CDAYS being less than or equal to MDAYS means that there is sufficient available light for first anthesis to occur on the selected first flowering date if primed seed is sown so that emergence takes place MDAYS prior to that selected date. When CDAYS is greater than MDAYS, seed must be sown so that the emergence date occurs earlier than MDAYS prior to the selected first flowering date because the amount of light is insufficient. In this specific example of the invention, the adjustments to the schedule made in block 42 thus merely reflect the requirement that the emergence date, and, consequently, the sowing and priming dates, must occur earlier than 35 days prior to the selected date of first flowering when there is insufficient light during that 35 day period.

The incrementation of MDAYS and the recomputation of CDAYS described above is used by the rest of the circuitry in FIG. 4 to determine how much earlier priming, sowing, and emergence must be. Specifically, when CDAYS achieves a value which is less than or equal to MDAYS, as determined at block 68, a determination is made at blocks 72 and 74 to see if CDAYS is between 35 days and 58 days, the minimum and maximum number of days expected for first anthesis to occur in tomato plants. If CDAYS is less than or equal to 35 days, then the emergence date for the crop block under consideration is set at 35 days before the selected date of first flowering determined earlier, which means that primed seed is sown two days before that. The priming, sowing, and emergence dates may be recorded in block 76. If CDAYS is between 35 and 58 days, then CDAYS is set as the date of emergence, which means that primed seed must be sown 2 days before that. The priming, sowing, and emergence dates may be recorded in block 78.

After the adjusted dates are recorded at blocks 76 and 78, any necessary correction so that proper Julian dates are recorded is made at block 54b. Those corrected dates may be inserted into the adjusted schedule storage elements 44, 46, and 48 originally shown in FIG. 2. Once the schedule has been adjusted for one crop block, the date of first anthesis and the adjustments to the schedule for the next crop are made by way of block 80 at which point the operations just described are repeated. After that, those operations are repeated until the adjusted sowing and emergence dates for all crop blocks have been determined If CDAYS is greater than 58, as determined at block 74, then there is not enough available light to properly grow the crop. At block 82, an indication can be made to the grower that more light is needed. The grower may then assume an increased amount of supplemental lighting and the circuit then may redo all the calculations beginning with the first crop based on the increased light.

Figure 5:
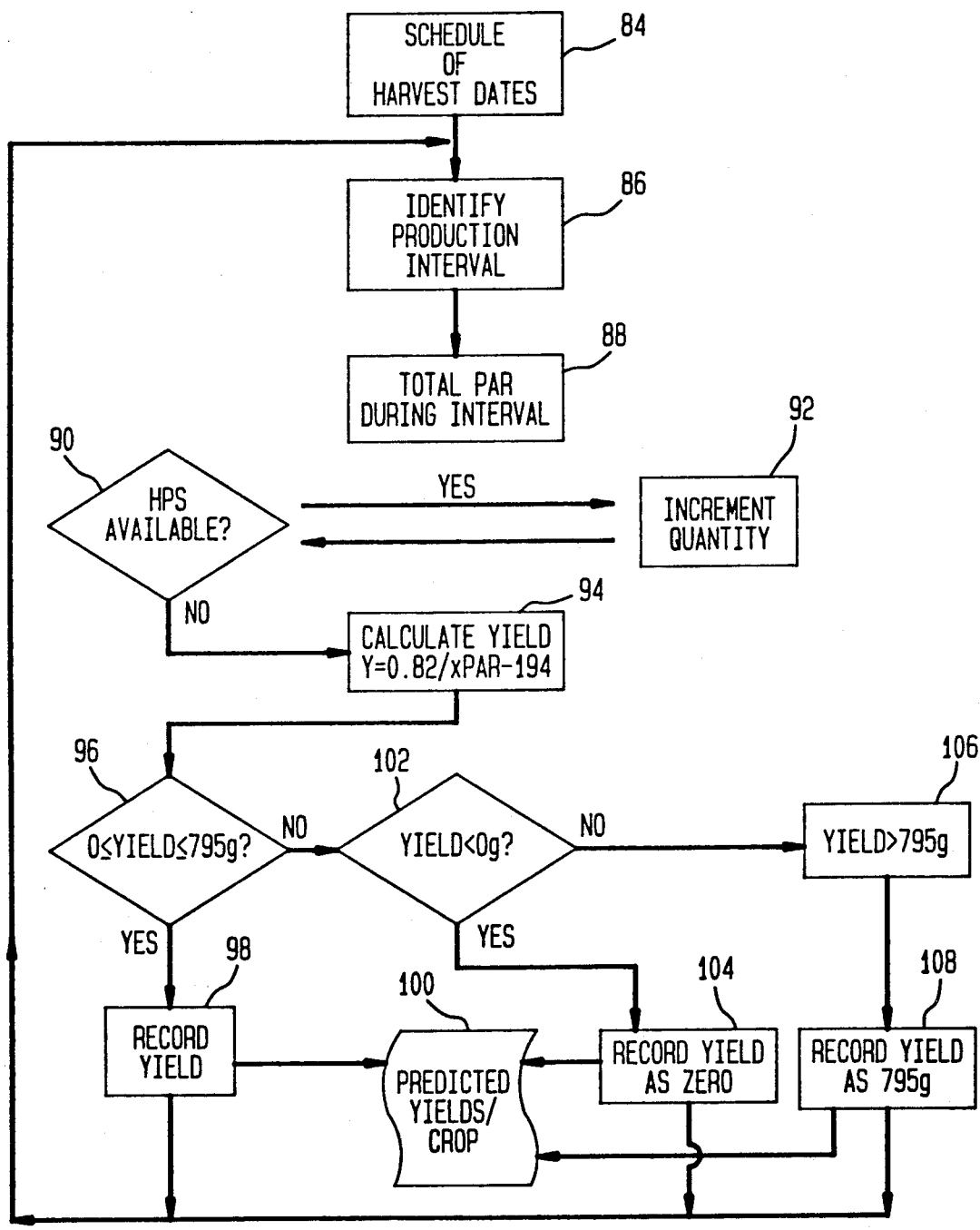
FIG. 5 is a more detailed schematic diagram representing the electronic circuitry of the yield prediction block of FIG. 1.

FIG. 5 shows the details of the circuitry for computing the predicted yield of each crop block. It is based on the fact that the inventors have found that the amount of PAR received by the plant from first anthesis to the final harvest date will affect the size of the fruit and thus the yield of the plants. The inventors have found that the relationship between the amount of PAR received during this period and the yield of tomatoes may be represented by the following:

$$Y = [0.821 * PAR] - 194,$$

where Y is the weight in grams of tomatoes produced by each tomato plant and PAR is the total amount of photosynthetically active radiation received by the plants from first anthesis to final harvest in moles per square meter.

The circuitry of FIG. 5 first accesses at block 84 the data base containing information on the harvest ending dates for each of the crop blocks, which were determined as described above. Production intervals are identified for each of the crop blocks at block 86. The production intervals begin at a predetermined time prior to the harvest end date. In this example, as explained above, the harvest start date for each of the crop blocks may be two weeks prior to the harvest end date for each of the crop blocks. What the circuitry may do essentially is to subtract two weeks from each of the harvest end dates stored in memory and then it may store the results of those computations as the harvest start dates for each crop block. Also, the circuitry may subtract 60 days from the harvest end dates to define the beginning of the fruit development period which is useful in determining expected yield. This fruit development period coincides with the time period between first flowering and the end of harvest.

The circuit of FIG. 5 then computes the total PAR available for the fruit development period, from the date defining the beginning of that period to the date of final harvest, in blocks 88, 90, and 92. This computation is made in the same manner that the total PAR was calculated for the time between emergence and first anthesis in blocks 60, 62, and 64. The predicted yield in grams of fruit per plant is calculated in block 94 by using the yield equation defined above.

It has been determined that there is a realistic maximum yield that can be expected, in the case of the tomatoes in this example of the invention, about 795 grams of fruit per plant. If the calculated yield for the particular crop block under consideration is between from 0 to 795 grams per plant, as determined in block 96, then that calculated yield is recorded by the circuitry at block 98 in a storage element 100. Then, the yield for the next crop block is determined, as indicated by the arrow from the output of block 98 to the input of block 86. If the yield is not between 0 and 795 grams per plant, as determined at block 96, and the yield is determined to be less than zero, at block 102, then the yield is caused to be recorded at block 104 as zero in the storage element 100 and the yield of the next crop block is determined, as indicated by the arrow from the output of block 104 to the input of block 86. If the yield is calculated to be greater than 795 grams per plant, 795 grams per plant is recorded in storage element 100 via blocks 106 and 108 and the predicted yield is computed for the next crop block. The circuitry of FIG. 5 continues to operate until the predicted yields have been calculated for all crop blocks.

Figure 6:
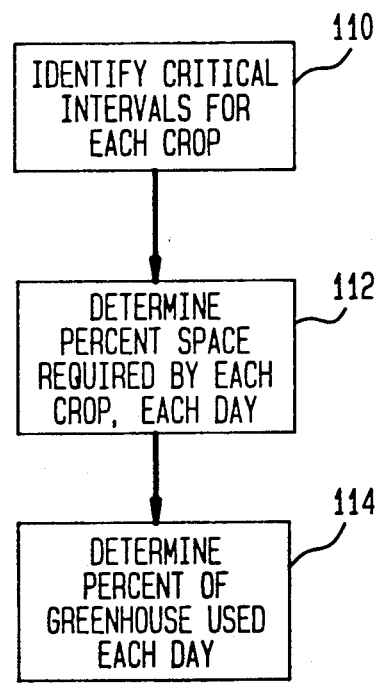
FIG. 6 is a detailed schematic diagram representing the electronic circuitry of the space allocation block of FIG. 1.

FIG. 6 shows the main aspects of the circuitry involved producing data useful to the grower in optimizing greenhouse space allocation. That circuitry may comprise three main parts, as indicated by the blocks in FIG. 6. The first part of the circuitry is a block 110 which identifies critical intervals in the growing cycle of the plants in the greenhouse relating to the spacing of the crop blocks in the greenhouse. In this example of the invention, tomato plants are spaced at four predetermined densities during the growing cycle as described above. The dates on which the plant density is to be changed for each crop block define the critical intervals determined by block 110.

This example of the invention may also include circuitry which determines the percent of the greenhouse required by each crop block as a function of Julian date in block 112. The total percentage of the greenhouse used each day may be computed by block 114, which gives some idea of how efficiently the greenhouse is being used.

Figure 7:
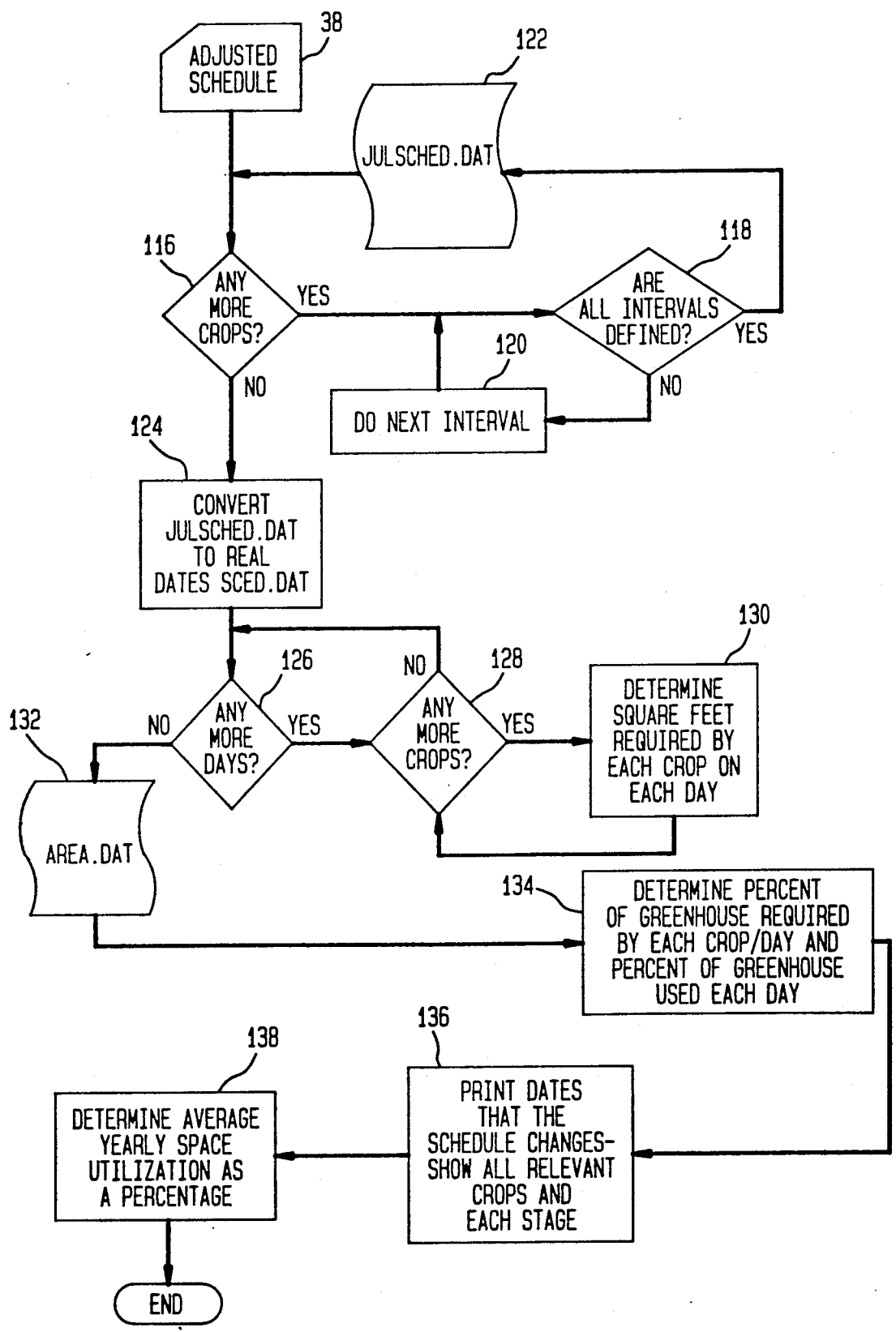
FIG. 7 is a more detailed schematic diagram of the circuitry represented in FIG. 6.

FIG. 7 shows further details of the circuitry of FIG. 6. The circuitry of FIG. 7 first defines critical intervals for transplanting and spacing the tomato plants in the greenhouse by computing the dates on which the spacing of the plants in each crop block is to change. In this example of the invention, sowing in plug trays referred to above occurs immediately after the seven day priming step mentioned above. Emergence is assumed to occur two days after plants are sown. Transplanting to four inch pots occurs a number of days after emergence equal to ten days plus a number of days equal to the quotient OVLP obtained by dividing by two the number of days between the adjusted emergence date and the unadjusted emergence date. The plants are transplanted to the eleven liter bags containing suitable growing medium and spaced at the final production density 60 days prior to the end of the harvest of the crop block. Spacing the four inch pots occurs 13 days plus a number of days equal to the integer remainder EXTR obtained in the division calculation described above prior to the date the plants are transplanted to the eleven liter bags. By adding a number of days equal to OVLP and EXTR in this manner, the computation of critical intervals takes into account any adjustments made to the schedule due to inadequate light during the initially assumed unadjusted time between emergence and first anthesis.

The Julian dates defining each of the critical intervals for each of the crop blocks is computed by the circuitry of FIG. 7. First, the unadjusted schedule in storage element 38 is queried for each of the crop blocks. If there are any of the crop blocks for which these Julian dates need to be computed, as determined in block 116, and if not all of the Julian dates have been defined, as determined by block 118, then the next of those dates is computed in block 120.

For each crop block I, the block 120 of FIG. 7 computes the Julian date at which the seed is to be primed PRIME (I), the Julian date at which the plants are to be transplanted to four inch pots TRAN4 (I), the Julian date at which the four inch pots are to be spaced so that the plant density is 24 plants per square meter SPAC4 (I), and the Julian date at which the plants are transplanted into bags and spaced at a density of 12 plants per square meter TRAN12(I). The results of these calculations is stored in a storage element 122.

When the critical dates have been identified, they are converted into calendar dates in block 124 and they may be displayed in any convenient fashion.

For each crop block I, data relating to the area required by each crop block on each day is computed by blocks 126, 128, and 130 and this data is stored in storage element 132.

In light of this data, the percentage of the greenhouse required by each crop on each day and the total percent of the greenhouse used each day may be computed in block 134.

The dates that the schedule changes may be printed at block 136. This printed information may show all relevant crops and each stage. Finally, the average space utilization of the greenhouse on a yearly or other basis may be computed in block 138, at which point the end of the program is reached.

The code listing of Appendix 1 is an example of how at least some of the flow chart of FIGS. 1-7 might be implemented in a computer program. Implementation of the remainder of the features of the flow chart in a computer program is readily apparent to those skilled in the art in light of the information given here and thus this implementation is not described here.

The following is an explanation of the abbreviations used in the listing of Appendix 1:

1. CYCEN (I)—the end of the harvest of crop block I;

2. CYCST (I)—the emergence date of crop block I;

3. YIELD (I)—the predicted yield of crop block I;

4. PRIME (I)—the date on which the start of the priming of the seed for crop block I is to occur;

5 TRAN4 (I)—the date on which the tomato plants in crop block I are to be transplanted into four inch pots and spaced so that they have a density of 97 plants per square meter;

6. SPAC4 (I)—the date on which the four inch pots are to be spaced so that the tomato plants in crop block I have a density of 24 plants per square meter;

7. NCRP—the number of crop blocks in a predetermined period of time such as 365 days;

8. STAR—the critical harvest date which is the same as the end of the harvest of the first in time crop block;

9. LIGHT—the amount of available light per day;

10. LIGHTOT—the amount of light accumulated over a period of time, either from emergence to first anthesis or from first flowering to the final harvest date of a crop block;

11. DAYS—the computed number of days between emergence and first flowering and between first flowering and end of harvest; and 12. MAXAREA—data relating to the maximum area of the greenhouse which is occupied at any time during the predetermined time crops are being grown in the greenhouse;

13. AREA (J)—data relating to the area of the greenhouse occupied by crops on day J;

14. ST (1,J)—data relating to the area of the greenhouse occupied by crop blocks with a plant density of 1550 plants per square meter on day J.

15. ST (2,J)—data relating to the area of the greenhouse occupied by crop blocks with a plant density of 97 plants per square meter on day J.

16. ST (3,J)—data relating to the area of the greenhouse occupied by crop blocks with a plant density of 24 plants per square meter on day J.

17. ST (4,J)—data relating to the area of the greenhouse occupied by crop blocks with a plant density of 12 plants per square meter on day J.

18. ABS (J)—calculated Julian date whereby ABS (J) equals the Julian date when the Julian date is between 1 and 183 or ABS (J) equals [365-(the Julian date)] when the Julian date is between 183 and 365.

In the area computations in Appendix 1, crop blocks having plant densities of 1550 plants per square meter each have been assigned an area number of 0.007, the crop blocks having plant densities of 97 plants per square meter have been each assigned an area number of 0.111, the crop blocks having plant densities of 24 plants per square meter have been each assigned an area number of 0.444, and the crop blocks having plant densities of 12 plants per square meter have been each assigned an area number of 0.879. These numbers signify the number of square feet occupied by one plant in a crop block having the respective plant density. The program of Appendix 1 normalizes data relating to the total computed areas to data relating to the maximum area occupied during the time crops are grown in the greenhouse. The area numbers may be converted to values indicating the total area occupied by a crop block by multiplying the area number by the number of plants in the crop block. When all crop blocks have an equal number of plants, adding the area numbers assigned to the crop blocks will give an indication of the total area occupied by the crops in the greenhouse.

Since the code in Appendix 1 is written in a conventional computer language understood by those skilled in the art, no further description is given here. The contents of the program is incorporated in this application as enabling disclosure and a full description of the inventors' best mode of carrying out the invention at this time.

Figure 8:
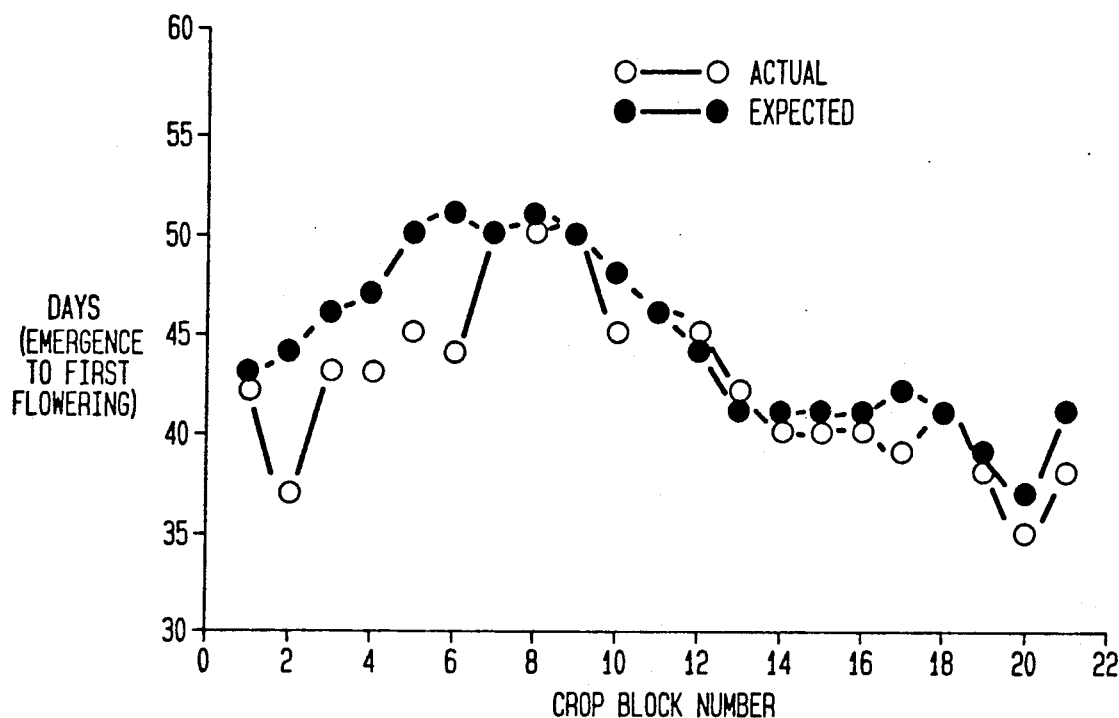
FIG. 8 is a graph comparing the actual experimentally determined number of days between emergence and first anthesis for tomato plants to the expected number of days between emergence and first anthesis predicted by the invention of this application.
Figure 9:
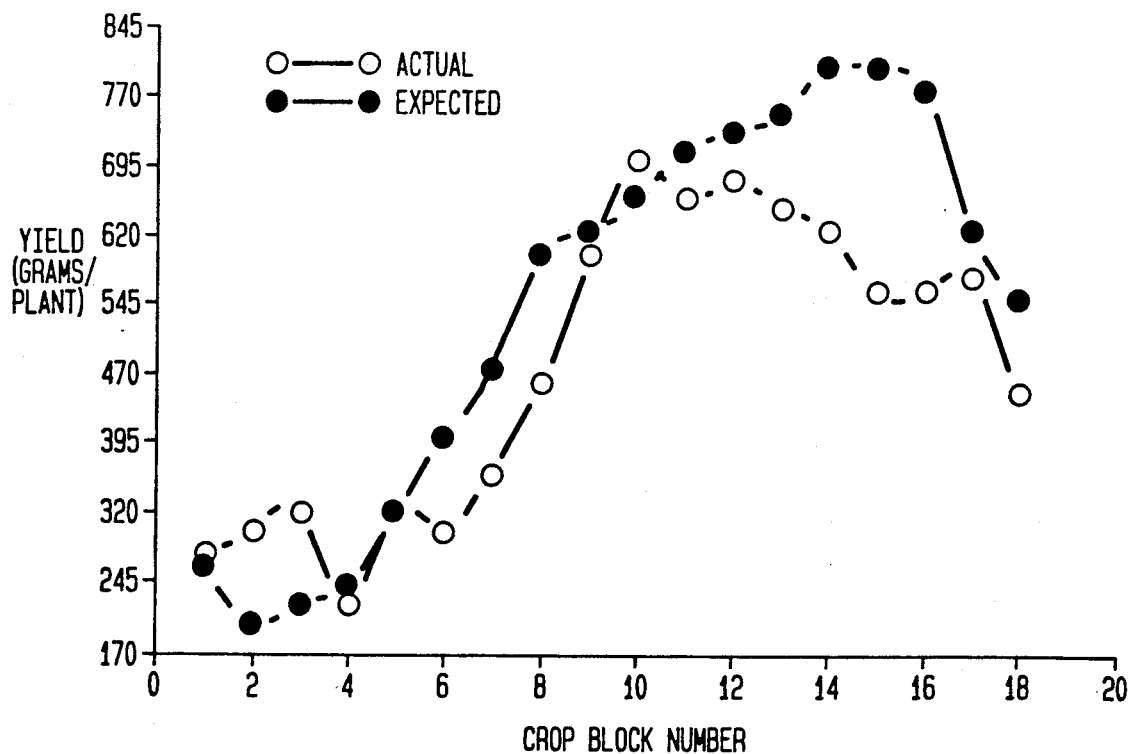
FIG. 9 is a graph comparing the actual experimentally determined yield of tomato plants to the expected yield predicted by the invention of this application.

The accuracy of the particular example of the invention described here was tested in a twelve month study in which successive distinct crop blocks were grown, each crop block being identified by a number on the horizontal axes of FIGS. 8 and 9. Timing and yield data were predicted by the invention. Actual timing and yield data were taken. Data points relating to predicted and actual data as functions of crop block are plotted in FIGS. 8 and 9, the distance along the vertical axes in FIGS. 8 and 9 indicating the values of the timing and the yield data, respectively. The graphs of FIGS. 8 and 9 plainly demonstrate that both the number of days from emergence to first flowering or first anthesis and the fresh fruit yield were accurately forecast by the invention. Accordingly, the invention of this application is a significant step toward truly commercially viable controlled environment agriculture.

Appendix 1

```
'*SET THE CYCLE IN MOTION 95 DAY CYCLES*

DIM CYCEN(52),CYCST(52),YIELD(52),PRIME(52),SPAC4(52),TRAN4(52),TRAN12(52),D(52,6)
DIM AREA(365),ST(4,365)
INPUT"HOW MANY CROPS?";NCRP                  :'
INPUT"WHAT IS YOUR CRITICAL HARVEST DATE";STAR :'
EXTRA=365 MOD NCRP : LPCT=1                  :' PARAMETERS
OVERLAP=INT(365/NCRP)                         :'
CYCEN(1)=STAR                                 :'
CYCST(1)=STAR-95                              :'
                                              :'
    FOR I=2 TO NCRP                           :'
         CYCEN(I)=(CYCEN(I-1)+OVERLAP)        :'SET 95 DAY CYCLE
         CYCST(I)= CYCEN(I)-95                :'
    NEXT I                                    :'
                                              :'
    FOR I=1 TO EXTRA-1                        :'
         CYCST(I+1)=CYCST(I+1)+I              :'EVENLY SPREAD EXTRA
         CYCEN(I+1)=CYCEN(I+1)+I              :'DAYS THRUOUT
    NEXT I                                    :'
                                              :'
    FOR I=EXTRA TO (NCRP-1)                   :'
         CYCST(I+1)=CYCST(I+1)+EXTRA          :'SPREAD EVEN CONT.
         CYCEN(I+1)=CYCEN(I+1)+EXTRA          :'
    NEXT I                                    :'
                                              :'
FOR I=1 TO NCRP                               :'
    IF CYCEN(I)>365 THEN CYCEN(I)=CYCEN(I)-365
    IF CYCEN(I)<1   THEN CYCEN(I)=CYCEN(I)+365 :' CORRECT FOR PROPER
    IF CYCST(I)>365 THEN CYCST(I)=CYCST(I)-365 :' JULIAN DATE
    IF CYCST(I)<1   THEN CYCST(I)=CYCST(I)+365
    PRINT CYCST(I);CYCEN(I)
NEXT I                                        :'
100 CONTINUE                                  :'
FOR I=1 TO NCRP                               :'BEGIN ADJUSTING SCHED
    J=CYCST(I)+35                             :'FOR LOW LIGHT
    IF J>183 THEN J=ABS(365-J)                :'
```

```
        lpct=2.23                                   :' temporary
        WHILE (DAYS)=S AND S(58)                    :'
            S=S+1                                   :'COUNTER AND DAY ACCUM
            LIGHT=ABS(J)*.085+4.42*LPCT             :'LIGHT PER DAY
            LIGHTOT=LIGHTOT+LIGHT                   :'LIGHT ACCUMULATED
            DAYS=(-.049)*LIGHTOT+86                 :'DAYS TO FLOWER
            J=J-1                                   :'
            IF J>183 THEN J=365-J                   :'CORRECT JULIAN DATE
            IF J<-183 THEN J=182                    :'
        WEND                                        :'
IF S=58 THEN PRINT "MORE LIGHT PLEASE": INPUT LPCT: S=0: LIGHTOT=0: GOTO 100
    IF S=58 THEN DAYS=58                            :'
    IF S<25 THEN DAYS =35
    S=0:LIGHTOT=0                                   :' FINAL ADJUSTMENT
    CYCST(I)=CYCST(I)-DAYS+35                       :'
    IF CYCST(I)>365 THEN CYCST(I)=CYCST(I)-365      :'
    IF CYCST(I)<1   THEN CYCST(I)=CYCST(I)+365
NEXT
'*YIELD PREDICTION*
FOR I=1 TO NCRP FOR J=(CYCEN(I)-60) TO CYCEN(I)
        K=ABS(J)
        IF K>183 THEN K=365-K                       :'CORRECT JULIAN DATE
        LIGHT=ABS(K)*.085+4.42*LPCT                 :'LIGHT PER DAY
        LIGHTOT=LIGHTOT+LIGHT                       :'LIGHT ACCUMULATED
    NEXT J YIELD(I)=.821*LIGHTOT-194                       :'YIELD PREDICTION
    IF YIELD(I)>795 THEN YIELD(I)=795
    print "Y=";YIELD(I);"L=";LIGHTOT                :'GRAMS PER PLANT
    LIGHTOT=0                                       :'
NEXT I                                              :'
                                                    :'
'SET FINAL SCHEDULE                             :'JULIAN DATES
                                                    :'
FOR I=1 TO NCRP                                     :'
PRIME(I)= INT(CYCST(I)-9)                           :'NEW VARIBLES FOR
OVLP=CYCEN(I)-CYCST(I)-95                           :'SOWING, SPACING,
IF OVLP<0 THEN OVLP=OVLP+365                        :'TRANSPLANTING
OVLP=INT(OVLP/2)                                    :'
EXTR=OVLP MOD 2                                     :'
TRAN4(I)=INT(CYCST(I)+10+OVLP)                      :'
TRAN12(I)=INT(CYCEN(I)-50)                          :'
SPAC4(I)=INT(TRAN12(I)-13-EXTR)           :'

NEXT I                                              :'
                                                    :'
PRINT:PRINT                                         :'
open"o",#3,"julsched.dat"
PRINT#3,"PRIME"TAB(10)"SOW"TAB(20)"TRANS4"TAB(30)"SPACE4"TAB(40)"TRANS12"TAB(50)"TERM"TAB(60)"YIELD
FOR I=1 TO NCRP
    CYCST(I)=INT(CYCST(I)): CYCEN(I)=INT(CYCEN(I))
    IF TRAN4(I)>365 THEN TRAN4(I)=TRAN4(I)-365      :'JULIAN DATE
    IF TRAN4(I)<1   THEN TRAN4(I)=TRAN4(I)+365      :'CORRECTIONS
    IF SPAC4(I)>365 THEN SPAC4(I)=SPAC4(I)-365      :'
    IF SPAC4(I)<1   THEN SPAC4(I)=SPAC4(I) +365
    IF TRAN12(I)>365 THEN TRAN12(I)=TRAN12(I)-365   :'
    IF TRAN12(I)<1   THEN TRAN12(I)=TRAN12(I)+365
    IF PRIME(I)>365 THEN PRIME(I)=PRIME(I)-365      :'
    IF PRIME(I)<1   THEN PRIME(I)=PRIME(I)+365

PRINT#3,PRIME(I);TAB(10);CYCST(I);TAB(20);TRAN4(I);TAB(30);SPAC4(I);TAB(40);TRAN12(I);TAB(50);CYCEN(I);TAB(60);YIELD(I)
```

```
D(I,1)=PRIME(I)                                         :'
D(I,2)=CYCST(I)                                         :'SET ALL VARIABLES
D(I,3)=TRAN4(I)                                         :'TO COMMON MATRIX
D(I,4)=SPAC4(I)                                         :' FOR CONVERSION
D(I,5)=TRAN12(I)                                        :'TO REAL DATES
D(I,6)=CYCEN(I)                                         :'
                                                        :'
NEXT I
close#3
PRINT"PRIME"TAB(12)"SOW"TAB(22)"TRANS4"TAB(32)"SPACE4"TAB(42)"TRANS12"TAB(52)"TERM"TAB(62)"YIELD
open"o",#3,"sched.dat"
FOR I=1 TO NCRP                                         :'
FOR J=1 TO 6                                            :'
                                                        :'
 IF D(I,J)<32 THEN E$=" 1/"+STR$(D(I,J))                :'JULIAN
 IF D(I,J)>31 AND D(I,J)<60 THEN E$=" 2/"+STR$(D(I,J)-31)    :'DATE
 IF D(I,J)>59 AND D(I,J)<91 THEN E$=" 3/"+STR$(D(I,J)-59)    :'CONVERTION
 IF D(I,J)>90 AND D(I,J)<121 THEN E$=" 4/"+STR$(D(I,J)-90)   :'EQUATIONS
 IF D(I,J)>120 AND D(I,J)<152 THEN E$=" 5/"+STR$(D(I,J)-120) :'
 IF D(I,J)>151 AND D(I,J)<182 THEN E$=" 6/"+STR$(D(I,J)-151) :'
 IF D(I,J)>181 AND D(I,J)<213 THEN E$=" 7/"+STR$(D(I,J)-181) :'
 IF D(I,J)>212 AND D(I,J)<244 THEN E$=" 8/"+STR$(D(I,J)-212) :'
 IF D(I,J)>243 AND D(I,J)<274 THEN E$=" 9/"+STR$(D(I,J)-243) :'
 IF D(I,J)>273 AND D(I,J)<305 THEN E$=" 10/"+STR$(D(I,J)-273):'
 IF D(I,J)>304 AND D(I,J)<335 THEN E$=" 11/"+STR$(D(I,J)-304):'
 IF D(I,J)>334 THEN E$=" 12/"+STR$(D(I,J)-334)               :'
                                                        :'
PRINT#3,TAB((J-1)*10)E$;                                :'
NEXT J
PRINT#3,TAB(62)YIELD(I)
NEXT I
close#3
'####### SUBROUTINES FOR OPTIMIZATION ############

'#### SET AREA FOR OVERLAP ####
' PRIME(I);;CYCST(I);;TRAN4(I);;SPAC4(I);;TRAN12(I);;CYCEN(I);
MAXAREA=0
FOR J=1 TO 365
FOR I=1 TO NCRP

IF (TRAN4(I)< CYCST(I) AND  J=CYCST(I)) THEN AREA(J)=AREA(J)+.007: ST(1,J)=ST(1,J)+.007
IF (TRAN4(I)< CYCST(I) AND J<TRAN4(I)) THEN AREA(J)=AREA(J)+.007: ST(1,J)=ST(1,J)+.007
IF (J)=CYCST(I) AND J<TRAN4(I)) THEN AREA(J)=AREA(J)+.007: ST(1,J)=ST(1,J)+.007

IF (SPAC4(I)<TRAN4(I) AND J)=TRAN4(I)) THEN AREA(J)=AREA(J)+.111: ST(2,J)=ST(2,J)+.111
IF (SPAC4(I)<TRAN4(I) AND (J<SPAC4(I)) THEN AREA(J)=AREA(J)+.111: ST(2,J)=ST(2,J)+.111
IF (J)=TRAN4(I) AND J<SPAC4(I)) THEN AREA(J)=AREA(J)+.111: ST(2,J)=ST(2,J)+.111

IF (TRAN12(I)<SPAC4(I) AND (J)=SPAC4(I)) THEN AREA(J)=AREA(J)+.444: ST(3,J)=ST(3,J)+.444
IF (TRAN12(I)<SPAC4(I) AND J<TRAN12(I)) THEN AREA(J)=AREA(J)+.444: ST(3,J)=ST(3,J)+.444
IF (J)=SPAC4(I) AND J<TRAN12(I)) THEN AREA(J)=AREA(J)+.444: ST(3,J)=ST(3,J)+.444

IF (CYCEN(I)<TRAN12(I) AND J)=TRAN12(I)) THEN AREA(J)=AREA(J)+.879: ST(4,J)=ST(4,J)+.879
IF (CYCEN(I)<TRAN12(I) AND (J<CYCEN(I)) THEN AREA(J)=AREA(J)+.879: ST(4,J)=ST(4,J)+.879
IF (J)=TRAN12(I) AND J<CYCEN(I)) THEN AREA(J)=AREA(J)+.879: ST(4,J)=ST(4,J)+.879

IF AREA(J)>MAXAREA THEN MAXAREA=AREA(J)

NEXT I
NEXT J
SPACPCT=1/MAXAREA
OPEN "O",#2,"AREA.DAT"
```

```
FOR J=1 TO 365
AREA(J)=AREA(J)*SPACPCT
ST(1,J)=ST(1,J)*SPACPCT
ST(2,J)=ST(2,J)*SPACPCT
ST(3,J)=ST(3,J)*SPACPCT
ST(4,J)=ST(4,J)*SPACPCT
PRINT#2,USING "###.###    ";J;ST(1,J);ST(2,J);ST(3,J);ST(4,J);AREA(J)
atot=atot+area(j)
'if (psta()st(1,j) or pstb()st(2,j) or pstc()st(3,j) or pstd()st(4,j))
then PRINT j;st(1,j);st(2,j);st(3,j);st(4,j);area(j)
'psta=st(1,j):pstb=st(2,j):pstc=st(3,j):pstd=st(4,j)
if parea()area(j) then print using "###.###";j;st(1,j);st(2,j);st(3,j);st(4,j);area(j)
parea=area(j)
NEXT J
print "area used ";atot/365
CLOSE#2
```

We claim:

1. A method of cultivating a block of tomato plants so that said tomato plants in said block will first flower on a first flowering date comprising the steps of:
   (a) selecting the first flowering date;
   (b) selecting an emergence date prior to said first flowering date such that there is an interval of I days between the emergence date and the first flowering date where:
   $I \leq 58$;
   $I = DAYS$
   for values of DAYS greater than or equal to 35; and $I = 35$
   for values of DAYS less than 35;
   Where:
   $DAYS = ((-0.049)*LIGHTOT) + 86$
   and LIGHTOT = the amount of photosynthetically active radiation in an environment during said interval in moles per square meter;
   (c) providing tomato plants in said environment so that said tomato plants are emergent on said emergence date; and
   (d) maintaining said tomato plants in said environment at least until said first flowering date while providing $CO_2$ concentration of about 400-800 microliters/liter and temperature of about 21°-27° C. during the daytime and about 15°-17° C. at night.

2. A method as claimed in claim 1 wherein said step of maintaining said tomato plants in said environment includes the step of culturing said plants for single cluster tomato production.

3. A method as claimed in claim 2 wherein said environment is an environment which receives sunlight.

4. A method as claimed in claim 3 wherein said step of selecting said emergence date and said interval includes the steps of selecting an assumed emergence date such that there is an assumed interval including an assumed number of days MDAYS between said assumed emergence date and said first flowering date, said assumed number of days MDAYS being less than 58 days; performing calculations including calculating the amount of sunlight received in said environment during said assumed interval, calculating the value of LIGHTOT based at least in part upon said calculated amount of sunlight and calculating a value of DAYS as aforesaid using said value of LIGHTOT; determining whether or not said calculated value of DAYS is less than or equal to MDAYS and, if so, using said assumed number of days MDAYS as the value of DAYS in determination of the interval I and, if not, incrementing said assumed number of days MDAYS and repeating said calculations.

5. A method as claimed in claim 4 further comprising the step of terminating said calculations, and issuing a warning if the calculated value of DAYS exceeds 58 days.

6. A method as claimed in claim 4 wherein said assumed number MDAYS is initially set at 35 prior to said incrementing step.

7. A method as claimed in claim 4 wherein said environment is provided with controllable supplemental light, further comprising the step of increasing the amount of supplemental light if the calculated value of DAYS exceeds 58 days and recalculating LIGHTOT and DAYS as aforesaid based upon said increased amount of supplemental light as well as sunlight received by said environment.

8. A method as claimed in claim 1 wherein said step of selecting the first flowering date includes the step of selecting a desired harvest date and selecting said first flowering date based upon said desired harvest date and a maturation interval from flowering to harvest.

9. A method as claimed in claim 8 further comprising the steps of selecting a sowing date and a priming date based on said selected emergence date, said step of providing tomato plants in said environment including the steps of priming and sowing tomato seeds on the so selected priming and sowing dates.

10. A method of as claimed in claim 8 wherein said step of selecting a desired harvest date includes the step of selecting a plurality of harvest dates in a series, said step of selecting a desired first flowering date includes the step of selecting a plurality of desired first flowering dates using said plurality of desired harvest dates and said maturation interval and said step of selecting an emergence date includes the step of selecting a plurality of emergence dates based on said plurality of desired first flowering dates, and cultivating a plurality of blocks of tomato plants using said plurality of emergence dates.

11. A method as claimed in claim 10 wherein said environment is a greenhouse.

* * * * *